(12) United States Patent
Elliott et al.

(10) Patent No.: US 7,767,088 B2
(45) Date of Patent: Aug. 3, 2010

(54) WATER TREATMENT CLARIFIER BAFFLE

(75) Inventors: B. James Elliott, Twinsburg, OH (US); Trent Lydic, Lyndhurst, OH (US); Terry Fischer, Mantua, OH (US); Gary Waite, Waterford, PA (US)

(73) Assignee: Jet, Inc., Cleveland, OH (US)

( * ) Notice: Subject to any disclaimer, the term of this patent is extended or adjusted under 35 U.S.C. 154(b) by 110 days.

(21) Appl. No.: 11/949,900

(22) Filed: Dec. 4, 2007

(65) Prior Publication Data

US 2008/0128351 A1   Jun. 5, 2008

Related U.S. Application Data

(60) Provisional application No. 60/873,037, filed on Dec. 5, 2006.

(51) Int. Cl.
  *C02F 3/00* (2006.01)
(52) U.S. Cl. ...................................................... 210/541
(58) Field of Classification Search .................. 210/541
  See application file for complete search history.

(56) References Cited

U.S. PATENT DOCUMENTS

| | | | | |
|---|---|---|---|---|
| 3,025,962 A | * | 3/1962 | Williams | 210/86 |
| 3,195,727 A | * | 7/1965 | Kibbee | 210/195.4 |
| 3,216,573 A | * | 11/1965 | Irion | 210/220 |
| 3,883,427 A | | 5/1975 | Oldham et al. | |
| 4,093,549 A | * | 6/1978 | Wilson | 210/195.4 |
| 4,405,456 A | | 9/1983 | Kinzer et al. | |
| 4,859,325 A | * | 8/1989 | Cormier | 210/195.3 |
| 5,484,524 A | | 1/1996 | MacLaren et al. | |
| 6,165,359 A | * | 12/2000 | Drewery | 210/195.1 |
| 6,180,004 B1 | * | 1/2001 | Drewery | 210/221.2 |
| 6,200,472 B1 | | 3/2001 | Donald et al. | |
| 7,018,536 B2 | | 3/2006 | Couch | |
| 2003/0042199 A1 | | 3/2003 | Smith | |

OTHER PUBLICATIONS

International Preliminary Report on Patentability for PCT Application PCT/US07/86452. PCT Office of U.S. Patent and Trademark Office, Apr. 6, 2010 (16 pages).

* cited by examiner

*Primary Examiner*—Chester T Barry
(74) *Attorney, Agent, or Firm*—The Marbury Law Group PLLC

(57) ABSTRACT

A water treatment plant for water purification or the removal of organic matter, suspended solids and other pollutants from water or wastewater is formed from multiple sections of polymer that are assembled to form a pre-treatment chamber, a treatment chamber and a settling chamber. The plant is preferably formed of a polymer, such as HMWPE. The treatment chamber is preferably a biofilm-aeration chamber. An outer tank is comprised of first and second upper sections and first and second lower sections secured by mating flanges. A divider baffle forms an inner wall separating the pre-treatment and treatment chambers. A hanging clarifier baffle is formed to be suspended from the outer tank between the treatment chamber and the settling chamber and includes a lower wall with specific angled portions near an angled wall of a lower section of the tank.

6 Claims, 9 Drawing Sheets

WATER TREATMENT CLARIFIER BAFFLE

RELATED APPLICATIONS

This application claims the benefit of U.S. Provisional Application Ser. No. 60/873,037, filed Dec. 5, 2006, which is hereby incorporated by reference for all purposes.

BACKGROUND OF THE INVENTION

The present invention is drawn generally to treatment of wastewater and other water, hereinafter referred to collectively as water, which requires treatment for removal of suspended organic and/or non-organic matter. In one embodiment, the invention relates to a sectional water treatment plant formed from formable, preferably polymeric, material. Another embodiment of the invention relates to a clarifier baffle design for a water treatment plant that reduces the suspended solid count in a settling chamber by use of specific angled portions at the bottom of the baffle. In yet another embodiment, the invention is drawn to a polymeric water treatment apparatus utilizing a hanging clarifier baffle that incorporates specific angled portions at the bottom thereof.

BRIEF SUMMARY OF THE INVENTION

A water treatment plant for water purification or the removal of organic matter, suspended solids and other pollutants from water or wastewater is formed from multiple sections of a formable material that are assembled to form a pre-treatment chamber, a treatment chamber and a settling chamber. The formable material is preferably a polymer such as high molecular weight polyethylene (HMWPE), but may be any suitably strong and corrosion resistant polymer, thermoplastic, fiberglass-reinforced polymer, carbon fiber, or metal. The treatment chamber is preferably a biofilm-aeration chamber. An outer tank is comprised of first and second upper sections and first and second lower sections secured by mating flanges. A divider baffle forms an inner wall separating the pre-treatment and treatment chambers. A hanging clarifier baffle is formed to be suspended from the outer tank between the treatment chamber and the settling chamber and includes a lower wall with angled portions near an angled wall of a lower section of the tank.

DETAILED DESCRIPTION OF THE INVENTION

Figure 1:
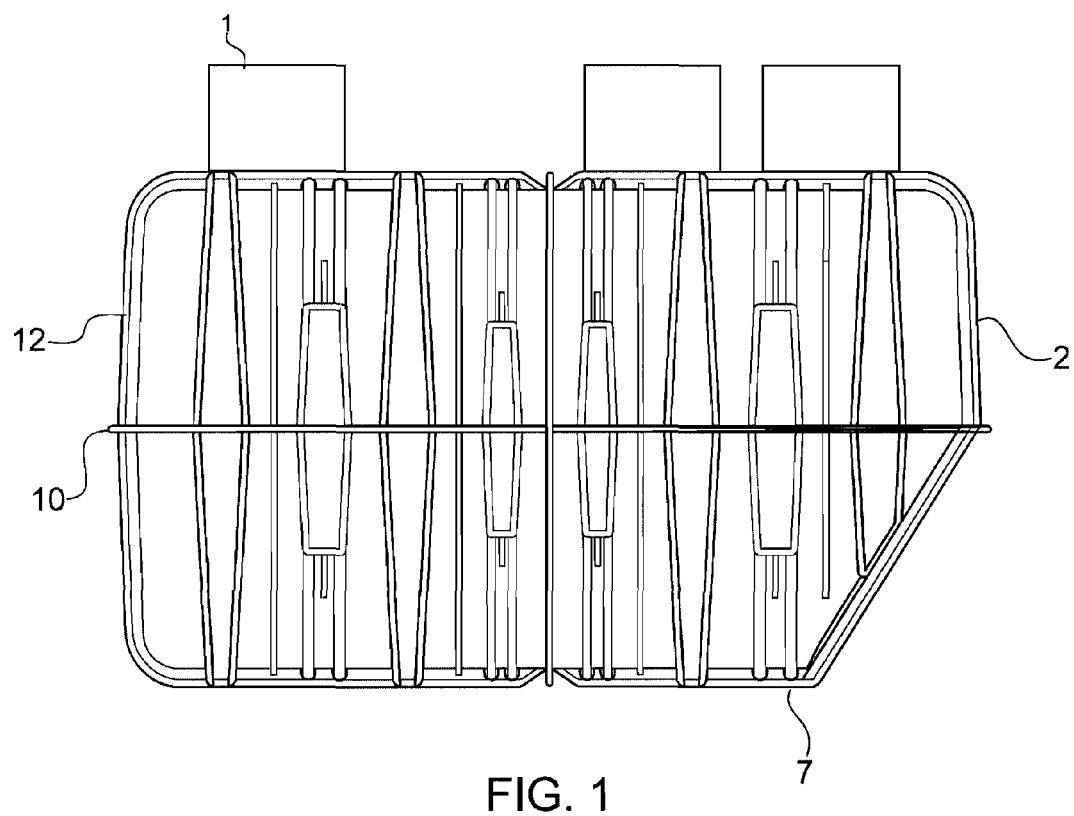
FIG. 1 illustrates a side elevation view of an embodiment of the present invention.

FIG. 1 illustrates a side elevation view of an embodiment of a water treatment plant. The tank portion shown is formed from a plurality of sections of polymeric material and joined together at a peripheral flange by suitable fasteners, such as bolts. The tank sections can be made of any suitable polymer and are preferably formed from high molecular weight polyethylene. As shown in the figure, the tank is preferably molded with reinforcement in the form of ribs or strengthening corrugations. The flowline level FL indicated on the figure is the normal operating level of water during treatment in the plant. Section line A-A in FIG. 1 relates to Section A-A of FIG. 7. In this particular example, the tank length is ~128.5" and all formed pieces are made from high molecular weight polyethylene formed from material having a starting gauge of 0.450".

Figure 2:
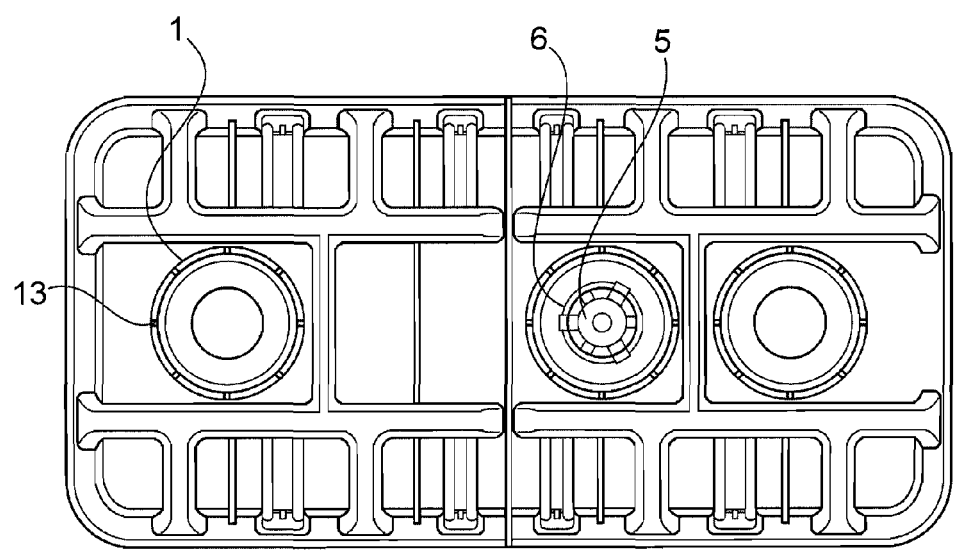
FIG. 2 illustrates a top view of an embodiment of the present invention.

A top view of an embodiment of a water treatment plant from FIG. 1 is illustrated in FIG. 2. The top view illustrates exemplary locations for the openings in the top of the tank. In this particular example, the openings have ~10" diameters and the risers surrounding them have ~20" diameters. Section line C-C in FIG. 2 corresponds to Section C-C of FIG. 5.

Figure 3:
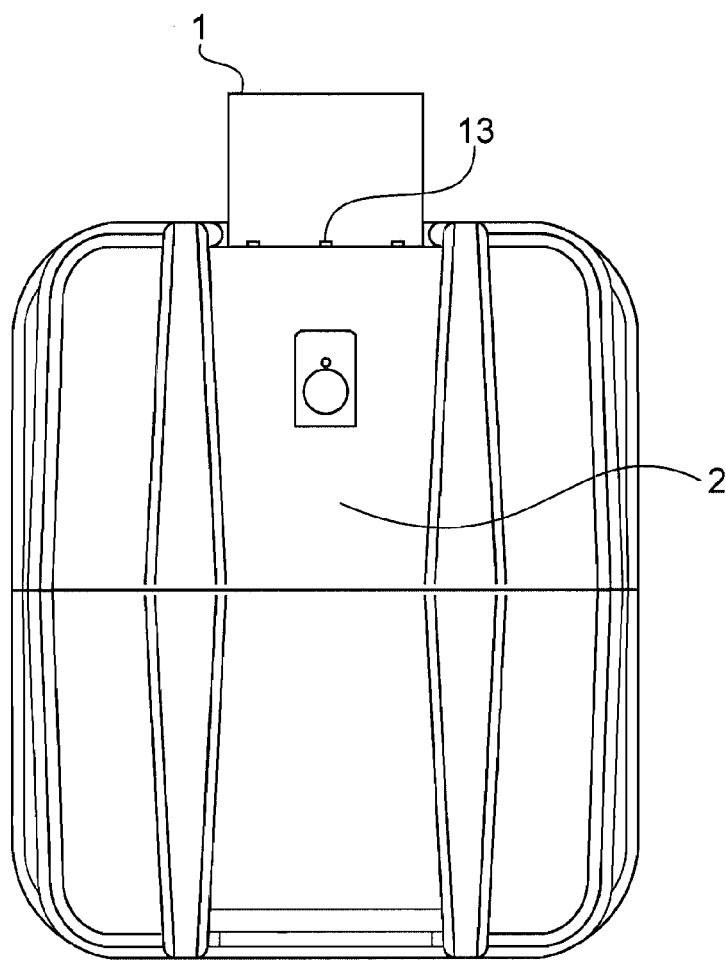
FIG. 3 illustrates an end elevation view of an embodiment of the present invention.

FIG. 3 illustrates an end elevation view of the outlet end of the tank of FIGS. 1 and 2. An outlet tee hole is shown adjacent to and above the flowline FL. In this example, the tank is ~63.3 inches wide and ~72.2 inches tall.

Figure 4:
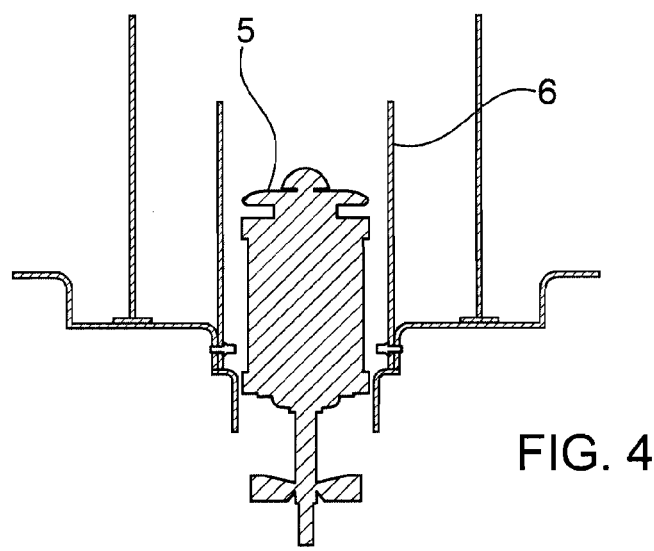
FIG. 4 illustrates a cross section view of aerator mounting in an embodiment of the present invention.

FIG. 4 illustrates a cross section view of aerator mounted in the tank of FIGS. 1, 2, and 3. Studs at the perimeter of the aerator opening 6 prevent rotation of the aerator assembly 5.

Figure 5:
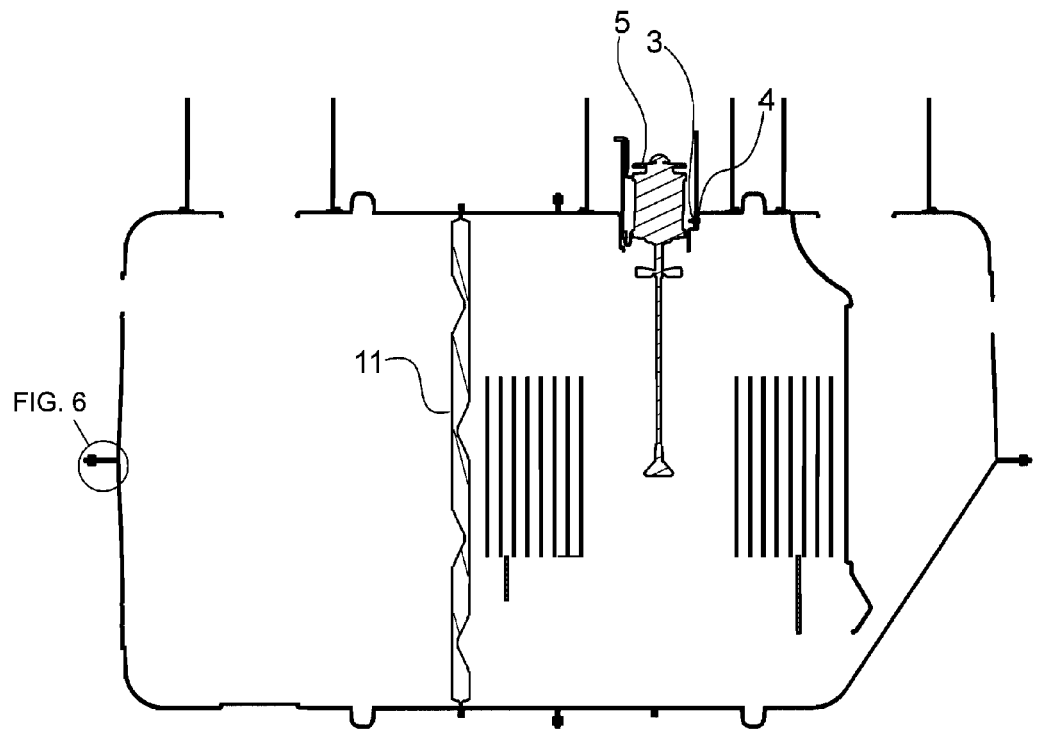
FIG. 5 illustrates a cross section plan view of an embodiment of the present invention.

FIG. 5 illustrates a cross section plan view, Section C-C. An inlet tee hole at one end provides an inlet for water to be treated into a pre-treatment chamber of the plant. The inlet tee hole has a lower edge ~2.87" above the flowline (not shown). In this example, the pre-treatment chamber has a surface area of approximately 17.5 in$^2$ and a volume of approximately 558.9 gallons. The pre-treatment chamber is separated from the other portions of the tank by a divider wall 11, sometimes referred to as a divider baffle. Details of the divider wall 11 are illustrated in Section A-A of FIG. 7. In this example, water flows from the pre-treatment chamber to the treatment chamber through a 5.50"diameter transfer tee hole centered approximately 4.63" below the flowline and approximately 11.75" off the centerline of the tank. The tee can be formed in any suitable manner, such as by perpendicular sections of PVC pipe, or can be replaced by a baffle, as sometimes found in prior art plants of this type.

The treatment chamber, in this example, is a biofilm-aeration chamber much like that disclosed in U.S. Pat. No. 5,484,524, which is hereby incorporated by reference in its entirety. In comparison to the pre-treatment chamber, the treatment chamber has a surface area of ~19.9 in$^2$ and a volume of ~635.7 gallons. In the present example, the treatment chamber has a substantially centrally-located aerator surrounded by biofilm support media. However, other configurations and technologies can be used and the invention is not meant to be limited to this exemplary embodiment. Two flat sheet media supports extend across the treatment chamber to support the biofilm support media. The aerator causes an upflow of water being treated in a central portion of the treatment chamber, which then flows downward through the biofilm media. The flat sheet media support on a side of the treatment chamber opposite the pre-treatment chamber extends lower than the other support to act as a baffle for down-flowing water and directs a portion of the water towards the settling or clarifier chamber.

Figure 13:
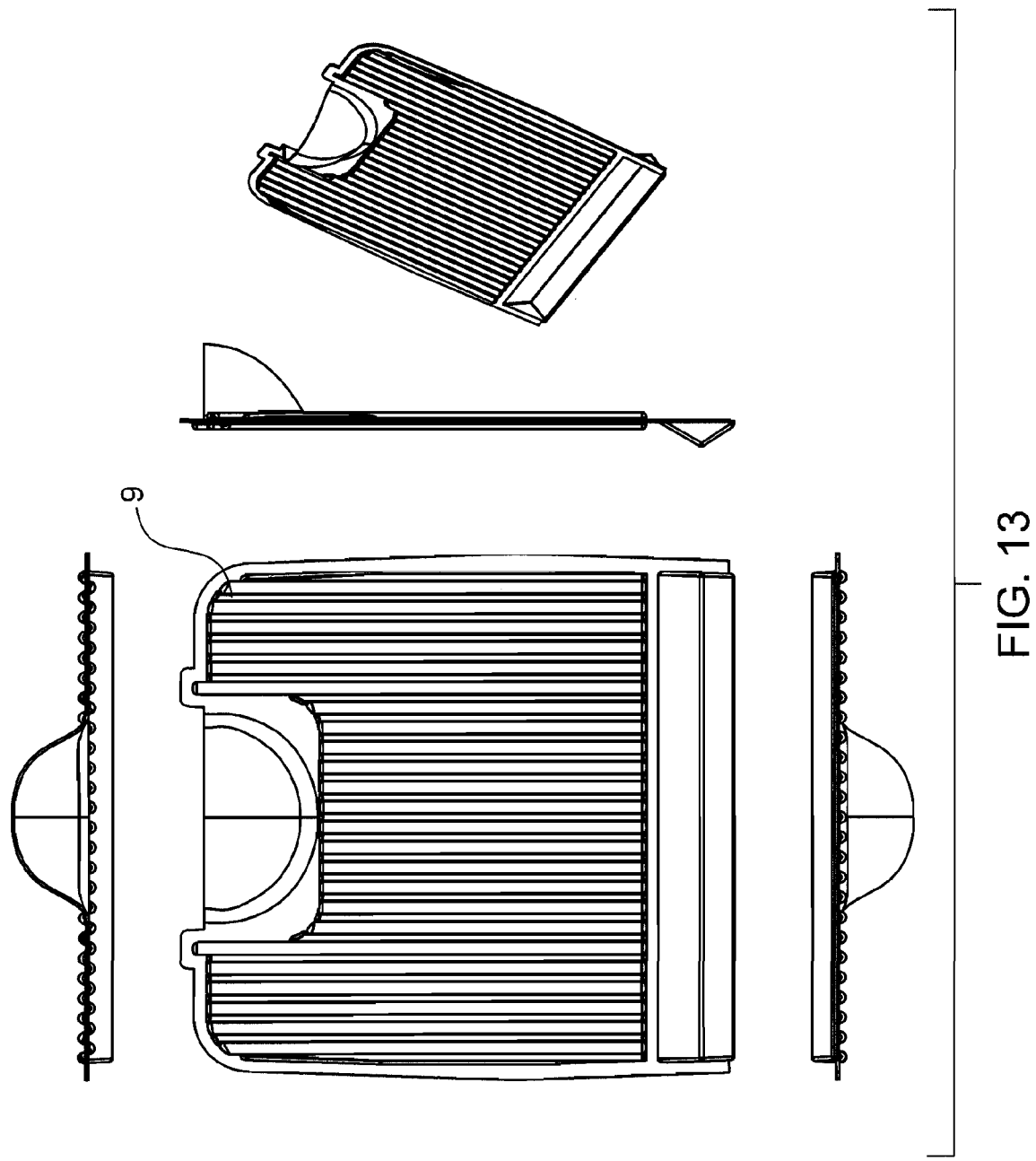
FIG. 13 illustrates a top, front, bottom, side, and isometric view of a hanging clarifier baffle in an embodiment of the present invention.

As illustrated in FIG. 5, the settling or clarifier chamber is separated from the treatment chamber by a hanging clarifier baffle, the details of which are disclosed in more detail in the drawings of FIG. 13. The settling or clarifier chamber has a surface area of ~7.3 in$^2$ and a volume of ~152.5 gallons in this example.

Figure 6:
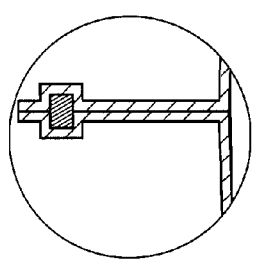
FIG. 6 illustrates a cross section of perimeter bolting flange details in an embodiment of the present invention.

The outer tank sections are connected to each other along flanges at the perimeter of each section. FIG. 6 illustrates a cross section of perimeter bolting flange Detail A. As illustrated, the flanges contain mating channels for provision of a butyl seal.

Figure 7:
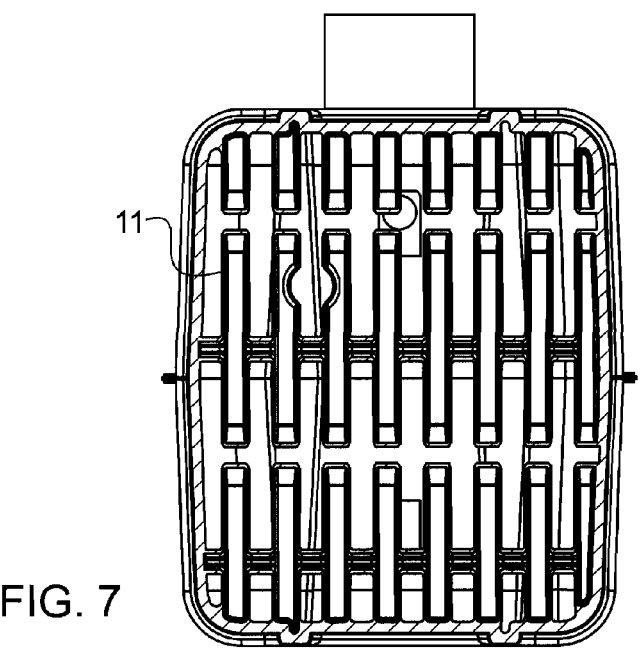
FIG. 7 illustrates a front view of a divider wall in an embodiment of the present invention.

FIG. 7 illustrates a front view of a divider wall Section A-A from FIG. 1. As seen in the figure, the divider wall includes a peripheral edge that is dimensioned to fit a channel in the inner walls of an upper and a lower tank section. Channels are formed in the structure to strengthen the divider wall.

Figure 8:
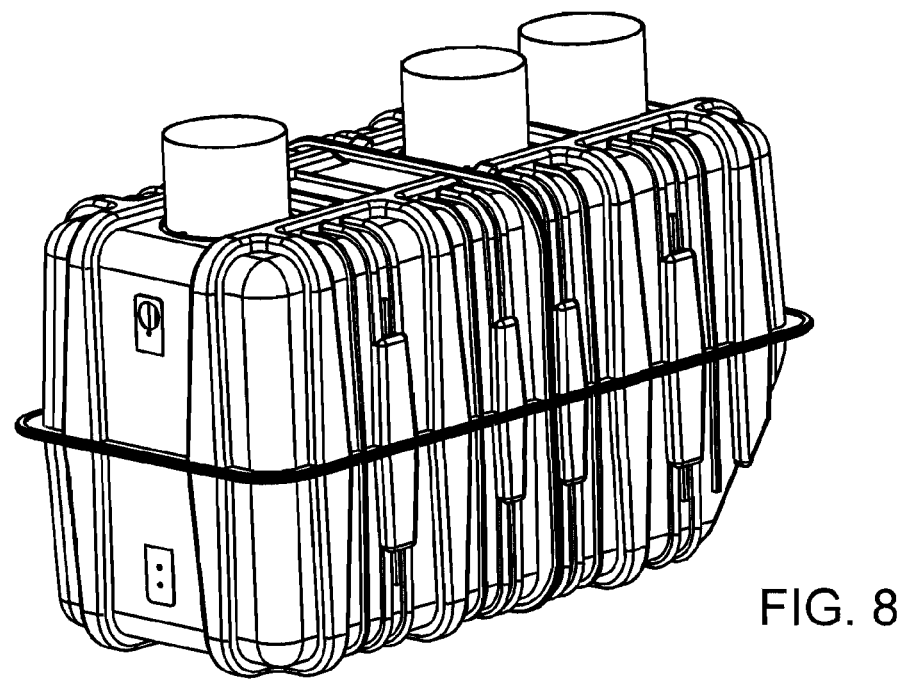
FIG. 8 illustrates an isometric view of an embodiment of the present invention.
Figure 9:
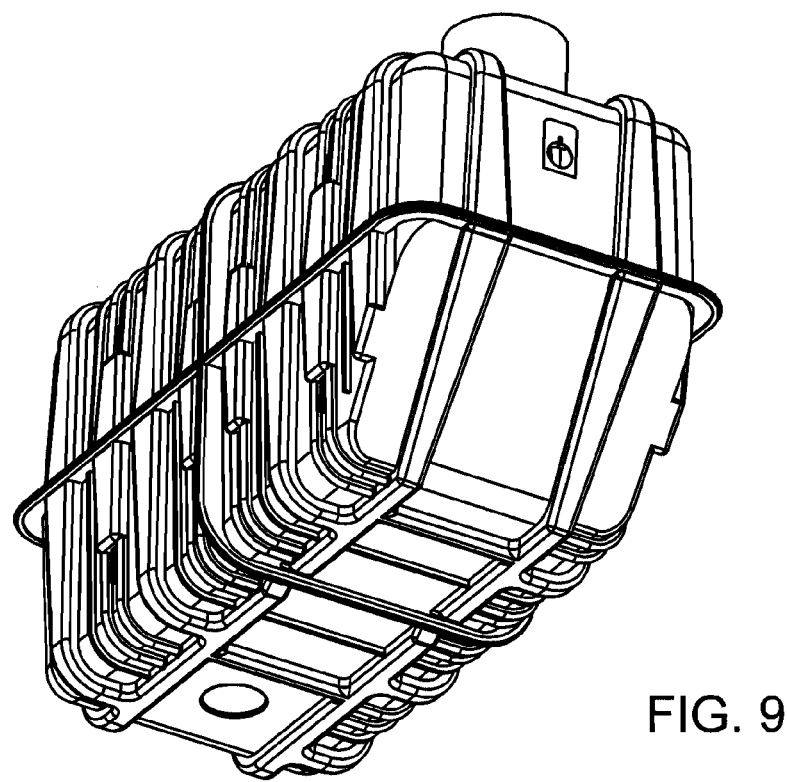
FIG. 9 illustrates another isometric view of an embodiment of the present invention.

FIG. 8 illustrates an isometric view of an embodiment of the present invention showing the inlet end, top, and front wall. Risers for a first, second and third upper opening are illustrated. FIG. 9 illustrates another isometric view of showing the outlet end, bottom, and front wall. As seen in FIGS. 8 and 9, the tank sections are joined with horizontally-oriented side, top, bottom, and end flanges and vertically-oriented central flanges.

Figure 10:
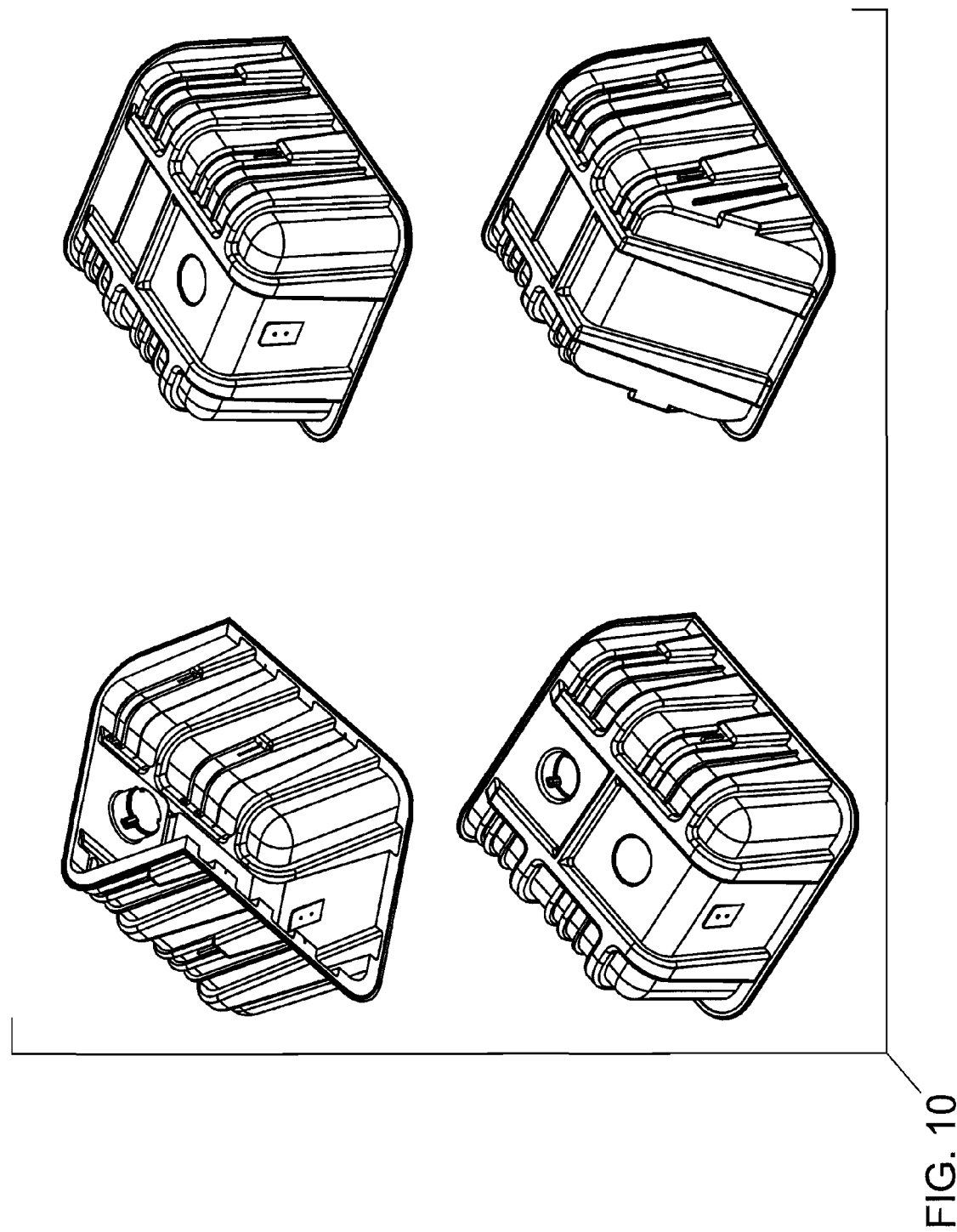
FIG. 10 illustrates an isometric view of each tank section in an embodiment of the present invention.
Figure 11:
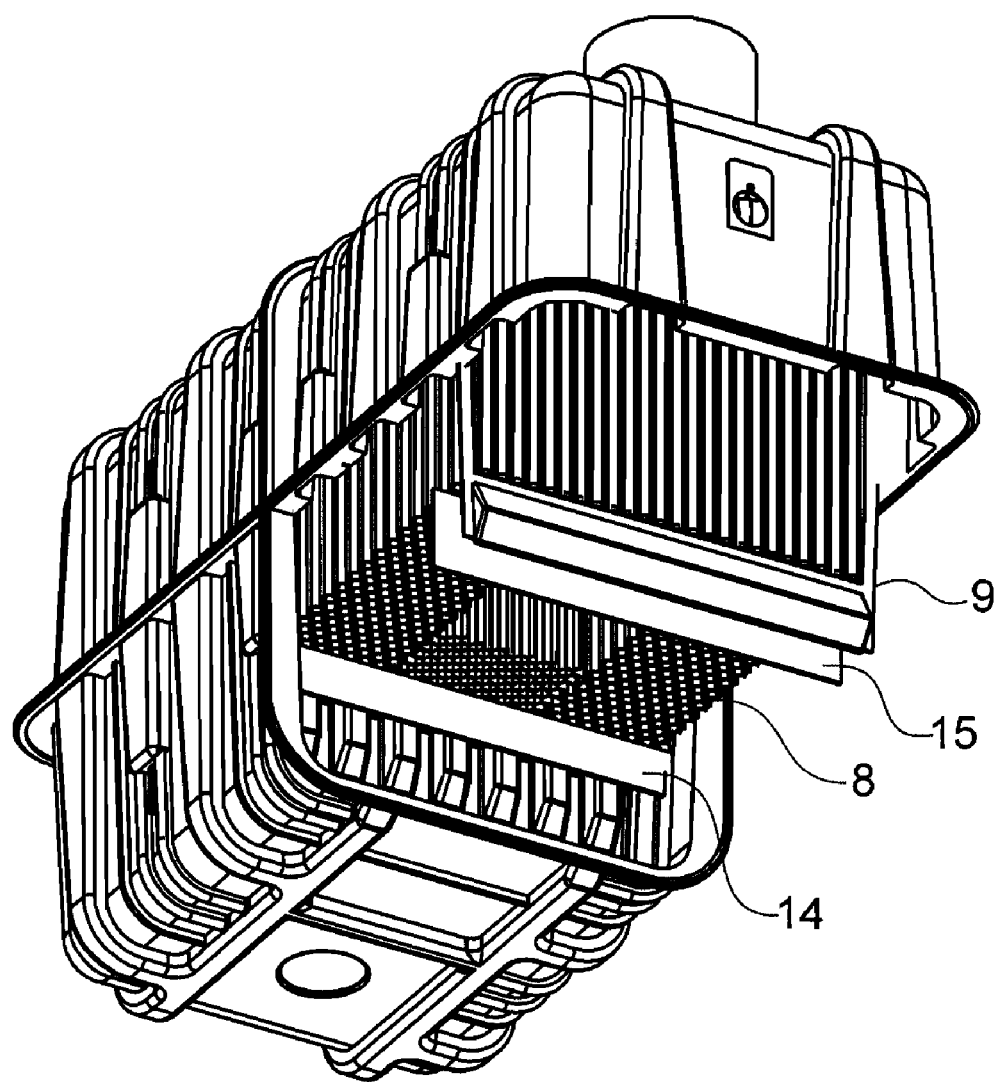
FIG. 11 illustrates an isometric view of an assembled tank with the angle plastic removed in an embodiment of the present invention.

FIG. 10 illustrates an isometric view of various tank section in an embodiment of the present invention. In FIG. 11, an isometric view of an assembled tank is shown with the angle plastic removed. The divider wall, media supports, biofilm array, and hanging clarifier baffle can be seen.

Figure 12:
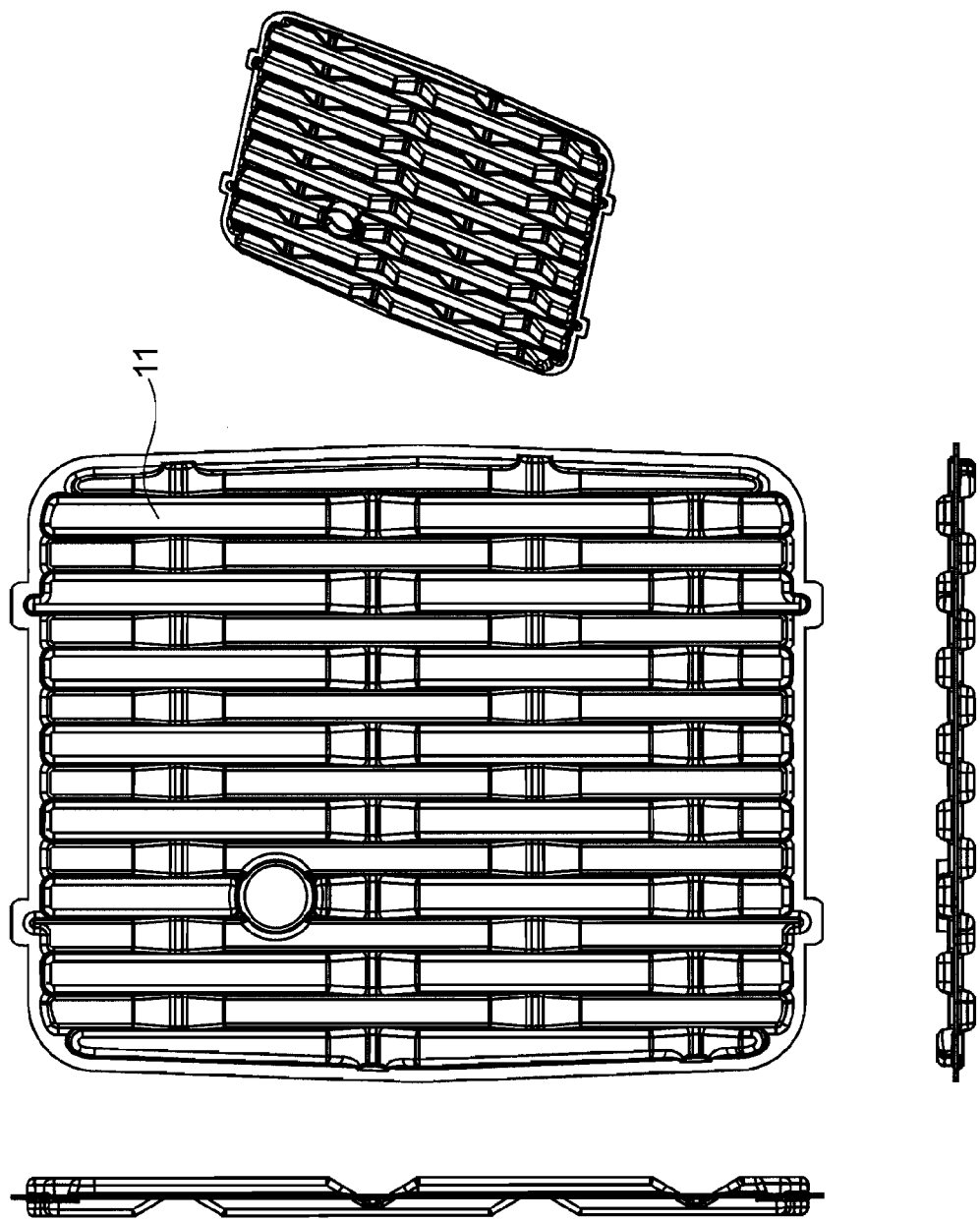
FIG. 12 illustrates a side, front, bottom, and isometric view of a divider wall in an embodiment of the present invention.

FIG. 12 discloses additional detail of the divider wall (labeled here as a divider baffle) by illustrating a side, front, bottom, and isometric view of a divider wall in an example embodiment.

Additional details of the hanging clarifier baffle are disclosed in the drawings of FIG. 13, which include a top, front, bottom, side, and isometric view of an exemplary embodiment of a hanging clarifier baffle. A major portion of the baffle is formed as a flat, corrugated panel that forms a vertical wall portion of the clarifier baffle. Side and top edges of the baffle are dimensioned to fit a channel in the inner walls of an upper and a lower tank section. The upper central portion of the baffle is contoured in an arcuate manner toward the treatment tank to meet the top of the tank along a periphery of the third upper opening. In this manner, the settling chamber is formed substantially under the third upper opening.

Figure 14:
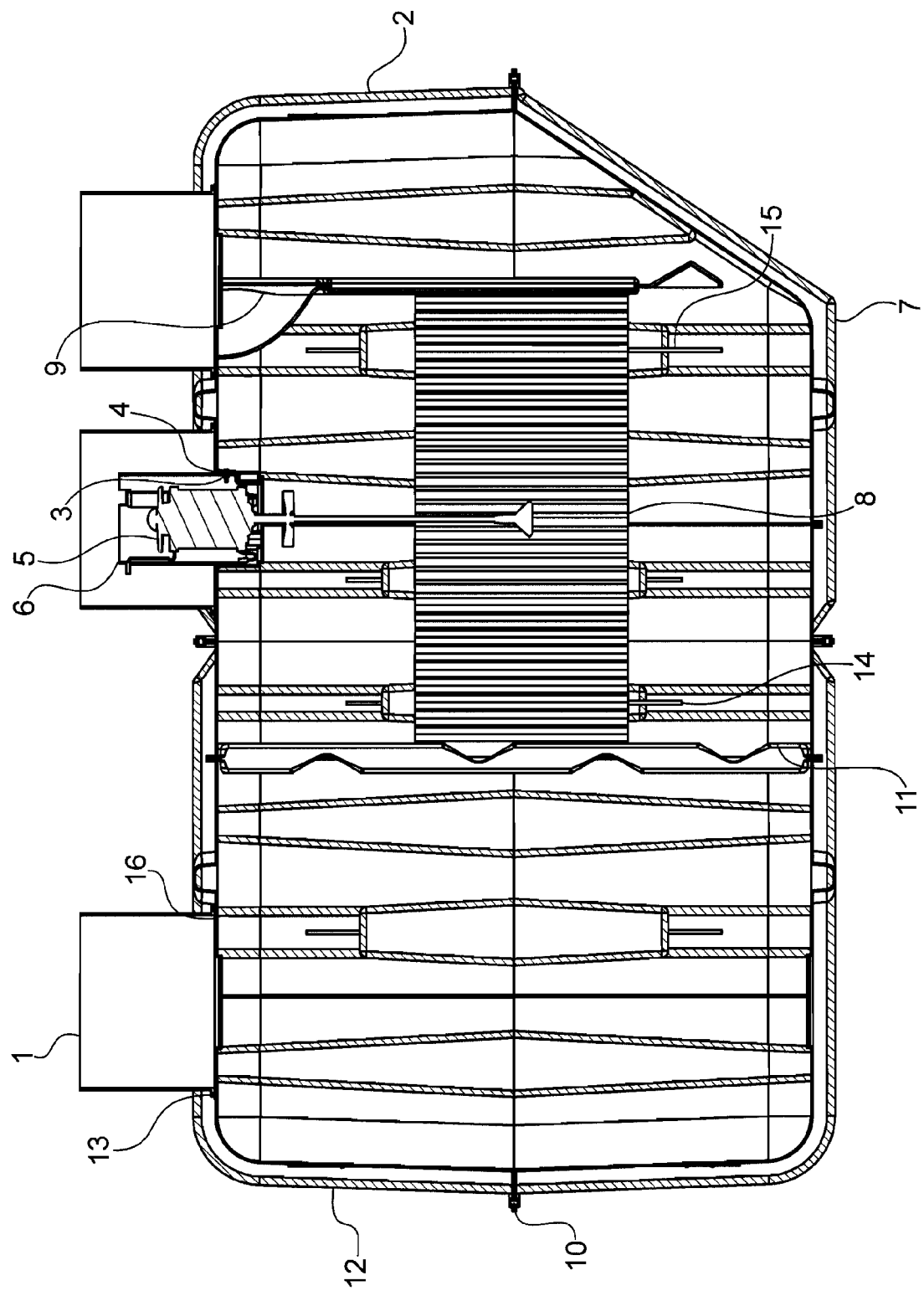
FIG. 14 illustrates a cross section view of an embodiment of the present invention.

At a lower end of the clarifier baffle, a lower wall portion is fixed to and extends from the vertical wall portion. The lower wall portion is angled downward and in a direction of the settling chamber. A bottom wall portion is fixed to and extends from the lower wall portion. The bottom wall portion extends below the lower wall portion and is angled downward and in a direction of the treatment chamber at a predetermined angle selected to be parallel to the angled lower wall of the settling chamber, as illustrated in FIGS. 5 and 14. In a disclosed embodiment, the planar lower wall portion of the hanging clarifier baffle is angled at approximately 30° downward from vertical and the planar bottom wall portion is angled at approximately −33.5° downward from vertical. In the illustrated embodiment, the lower wall portion and bottom wall portion are mounted or attached to a lower vertical wall extending from, and coplanar with, the corrugated panel of the hanging clarifier baffle.

In use, the lower wall portion allows the bottom wall portion of the clarifier baffle to be positioned in the usual location, yet allows the vertical portion of the clarifier baffle to be positioned further away from the outlet end of the settling chamber. This increases the volume of the settling tank. With the same amount of solids in the settling tank, the larger volume of the settling chamber due to relocation of the vertical portion of the clarifier baffle lowers the suspended solid count.

FIG. 14 illustrates another cross section view of an embodiment of the present invention. In this embodiment, risers 1 extend from the top of the treatment plant over each upper opening and can include a gasket 16 and flange 13. All the tank components in FIG. 14 are formed from high molecular weight polyethylene (HMWPE). A first upper section 12 of a tank includes a first upper opening. It is attached to a first lower section along horizontal front and back flanges (not shown) and an inlet end flange 10. The first upper section is attached to a second upper section 2 along vertical front and back flanges (not shown) and a central top flange.

The first upper and lower sections retain divider wall or baffle 11 to form a pre-treatment chamber. The first lower section includes and opening on the bottom for removal of settled material. The first lower section is attached to a second lower section (referred to as angle plastic) 7 along vertical front and back flanges (not shown) and a central bottom flange. The second lower section 7 is attached to a second upper section 2 along horizontal front and back flanges (not shown) and an outlet end flange. The second upper and lower sections retain a hanging clarifier baffle 9 to form a treatment chamber and a settling or clarifying chamber.

The second upper section 2 has a second upper opening that includes an aerator mount 3 and studs 4 to prevent rotation of the aerator 5. A separate riser 6 is provided for the aerator. Biofilm media 8 is positioned within the treatment chamber using supports 14 and 15.

In one embodiment, a polymeric water treatment apparatus for wastewater or water purification comprises a polymeric tank formed from a first upper section having a first upper opening, a second upper section having second and third upper openings, a first lower section, and a second lower section having an angled end wall. The first lower section is attached to the first upper section along a set of mating flanges, the first lower section is attached to the second lower section along a set of mating flanges, the second upper section is attached to the second lower section along a set of mating flanges, and the second upper section is attached to the first upper section along a set of mating flanges so as to form a tank capable of holding liquid to be treated. A dividing wall is adapted to be held in position between the first upper section and the first lower section so as to form a pre-treatment chamber below the first upper opening. The dividing wall has an opening in an upper portion thereof to pass water being treated to a treatment chamber. A hanging clarifier baffle adapted to be suspended between the second upper section and the second lower section so as to form a treatment chamber below the second upper opening and a settling chamber substantially below the third upper opening, wherein the clarifier baffle has an angled bottom wall portion at a bottom thereof suspended parallel and adjacent to the angled end wall of the second lower section.

Variations on this embodiment of the invention include those in which the hanging clarifier baffle comprises a vertical wall portion for separating a treatment chamber and a settling chamber; a lower wall portion angled downward and in a direction of the settling chamber; and the bottom wall portion below the lower wall portion and angled downward and in a direction of the treatment chamber. Optionally, the lower wall portion of the hanging clarifier baffle is angled at approximately 30° downward from vertical and the bottom wall portion is angled at approximately −33.5° downward from vertical. Preferably, the hanging clarifier baffle is formed of polymeric material. In certain embodiments, an upper wall portion of the hanging clarifier baffle includes a contoured section to accommodate an opening. The tank sections, dividing wall, and hanging clarifier baffle are formed of corrosion-resistant material selected from the group consisting of high molecular weight polyethylene, thermoplastic, fiberglass-reinforced polymer, carbon fiber, or metal. The tank sections, dividing wall, and hanging clarifier baffle preferably include strengthening corrugations.

In another embodiment, a clarifier baffle for a water treatment apparatus comprises a vertical wall portion for separating a treatment chamber and a settling chamber; a lower wall portion angled downward and in a direction of the settling chamber; and a bottom wall portion below the lower wall portion and angled downward and in a direction of the treatment chamber. Preferably, the bottom wall portion is angled to be parallel to an angled wall of the settling chamber. In a variation of this embodiment, the lower wall portion is angled at approximately 30° downward from vertical and the bottom wall portion is angled at approximately −33.5° downward from vertical. The baffle is preferably formed of polymeric material, but can be made of any known suitable corrosion-resistant material, including but not limited to concrete, high molecular weight polyethylene, thermoplastic, fiberglass-reinforced polymer, carbon fiber, or stainless-steel or other corrosion-resistant metal or metal treated in a fashion to render it corrosion resistant. In one embodiment of the clarifier baffle, an upper wall portion includes a contoured section to accommodate an opening so as to form the settling chamber substantially below the opening.

A water treatment apparatus and clarifier wall have been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A clarifier baffle in a wastewater treatment apparatus having a settling chamber with an angled lower wall, comprising:
    a vertical wall portion for separating a treatment chamber and the settling chamber;
    a planar lower wall portion fixed to and extending from the vertical wall portion, wherein the lower wall portion is angled downward and in a direction of the settling chamber; and
    a planar bottom wall portion fixed to and extending from the lower wall portion, wherein the bottom wall portion extends below the lower wall portion and is angled downward and in a direction of the treatment chamber at a predetermined angle selected to be parallel to the angled lower wall of the settling chamber.

2. The clarifier baffle of claim 1, wherein the lower wall portion and the bottom wall portion are fixed to a lower vertical wall extending from, and coplanar with, the vertical wall portion.

3. The clarifier baffle of claim 1, wherein the lower wall portion is angled at approximately 30° downward from vertical and the bottom wall portion is angled at approximately −33.5° downward from vertical.

4. The clarifier baffle of claim 1, wherein the baffle is formed of polymeric material.

5. The clarifier baffle of claim 1, wherein an upper wall portion includes a contoured section to accommodate an opening so as to form the settling chamber substantially below the opening.

6. The clarifier baffle of claim 1, wherein the clarifier baffle is fabricated from a formable corrosion-resistant material selected from the group consisting of concrete, high molecular weight polyethylene, thermoplastic, fiberglass-reinforced polymer, carbon fiber, or metal.

* * * * *